(12) United States Patent
Shima

(10) Patent No.: US 7,627,815 B2
(45) Date of Patent: Dec. 1, 2009

(54) OBJECT EDITING SYSTEM

(75) Inventor: Kotaro Shima, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 11/243,943

(22) Filed: Oct. 5, 2005

(65) Prior Publication Data

US 2006/0080597 A1 Apr. 13, 2006

(30) Foreign Application Priority Data

Oct. 7, 2004 (JP) .............................. 2004-295136

(51) Int. Cl.
| | |
|---|---|
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |
| G06F 3/048 | (2006.01) |

(52) U.S. Cl. ...................... 715/243; 715/788; 715/790

(58) Field of Classification Search ................ 715/509, 715/530, 520, 790, 243
See application file for complete search history.

(56) References Cited

U.S. PATENT DOCUMENTS

| 5,886,694 | A | * | 3/1999 | Breinberg et al. ............ 715/788 |
|---|---|---|---|---|
| 6,222,543 | B1 | * | 4/2001 | Knaapi et al. ............... 715/808 |
| 6,337,703 | B1 | * | 1/2002 | Konar et al. ................ 715/858 |
| 2004/0100499 | A1 | * | 5/2004 | Brockway et al. ........... 345/765 |

FOREIGN PATENT DOCUMENTS

| JP | 10011514 | 1/1998 |
|---|---|---|
| JP | 10232900 | 9/1998 |
| JP | 2001-265755 A | 9/2001 |
| JP | 10187683 | 7/2008 |

* cited by examiner

*Primary Examiner*—Joshua D Campbell
*Assistant Examiner*—Stephen Alvesteffer
(74) *Attorney, Agent, or Firm*—Andre Gibbs; Shimokaji & Associates, P.C.

(57) ABSTRACT

An editing apparatus for editing objects on a screen includes an object input display section for displaying contents which have been input by a user, as objects on a screen. The apparatus also includes an object extension section for superposing at least one side of a first object on one side or on an extension line of the side of a second object by extending an external form of the first object among the plurality of objects displayed by the object input display section, to a position within a range which does not overlap the second object.

9 Claims, 15 Drawing Sheets

OBJECT EDITING SYSTEM

FIELD OF THE INVENTION

The present invention relates to an object editing system and more particularly to an editing apparatus and an editing method, for aligning objects displayed on a screen, and a program product therefor.

BACKGROUND OF THE INVENTION

The creation of tables, as text material or presentation material, is a common but important task. Also, a method that employs tables whose frame lines are not displayed to define layouts is widely used in the preparation of web pages. The creation of tables is made possible by various application programs. As a conventional example of a basic method used for the creation of tables, a table is prepared for which the structure (the number of rows and the number of columns and the size of each cell) has previously been determined, and then, the contents are created.

However, for the preparation of a table having a complicated structure, this method presents the following problems. First, for a table having a complicated structure, it is difficult to know the exact number of rows and the number of columns that will ultimately be needed before the creation of the table. In many cases, rows and columns must be added or deleted later. Second, when a default table is created without being customized especially, the number of cells included in rows and columns tends to be fixed, and a process for combining or dividing cells is therefore required. Thus, a technique that supports an operation for creating a table having a complicated structure is desired.

A technique has been proposed whereby a plurality of patterns for table structures are designated in advance in correlation with the symbolic system, and based on input symbol strings, the patterns are sequentially employed to create tables. According to this tool, a complicated table can be easily created, so long as a user possesses expertise in the handling of symbols. Another technique has been proposed by which the patterns of tables, whose rows and columns are arranged in a nested structure, are managed in advance as tree structures, and a table is created based on a pattern designated by a user. According to this technique, since the patterns are managed in accordance with the tree structures, tables with relatively complicated structures can be easily prepared.

An additional technique has also been proposed, by which when special characters (temporary ruled lines) representing ruled lines are entered between character strings, temporary ruled lines are connected and changed to form frames for a table. According to this technique, even when a user does not create ruled lines, in anticipation of the contents to be entered in individual cells, the ruled lines are prepared based on the contents actually displayed in these cells, so that the likelihood that a table will have to be reconstructed is reduced, and work efficiency can be improved.

Further, there is a well known web page preparation support tool by which an object, displayed on an editing screen, is employed to create an HTML file describing a table where the pertinent object is used as a cell. According to this tool, since the position of the object, as arranged by a user, is maintained unchanged, intuitive image editing is made possible.

There are drawbacks to the known techniques. Acquiring expertise in and mastering asymbolic system is not always easy and it is anticipated that even a skilful computer user may have difficulty in handling the symbols. Moreover, in some cases a relatively large number of operations are required to appropriately select a required pattern. Frequently, the table created through the use of the known techniques does not match the structure envisioned by a user.

Furthermore, when a web page creation support tool is employed to arbitrarily arrange a plurality of objects, the structure of a table becomes complicated than expected and the size of the necessary HTML file can become large. For example, when a plurality of objects that should be aligned in the same row are slightly shifted vertically, the resulting table may display the objects in different rows. It may take a long time to generate a screen representation of the table. The delay may irritate the user of the browser generating the display.

In this case, when it is imperative that a plurality of objects be aligned in the same row, the burden imposed on a user is increased. Although grid lines could be employed that limit the locations of the objects to predetermined grid points, determining the disposition of the grid lines may not be easy, and the degree of freedom of the layout is reduced.

To resolve these shortcomings, one objective of the present invention is to provide an editing apparatus, an editing method and a program product therefor. This objective is achieved by a combination of the features described in the independent claims. The dependent claims of the present invention define additional advantageous specific examples of the present invention.

SUMMARY OF THE INVENTION

To achieve the above objective, according to a first aspect of the invention, an editing apparatus for editing objects on a screen includes an object input display section for displaying contents, which have been input by a user, as objects on the screen, and an object extension section for superposing at least one side of a first object on one side or an extension line of the side of a second object by extending an external form of the first object among the plurality of objects displayed by said object input display section, within a range of not in overlapping the second object.

BRIEF DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings wherein:

DETAILED DESCRIPTION

The present invention will now be described by explaining the preferred embodiment. However, the present invention cited in claims is not limited to the following embodiment, and all the combinations of the features explained in the embodiment are not always requisite.

Figure 1:
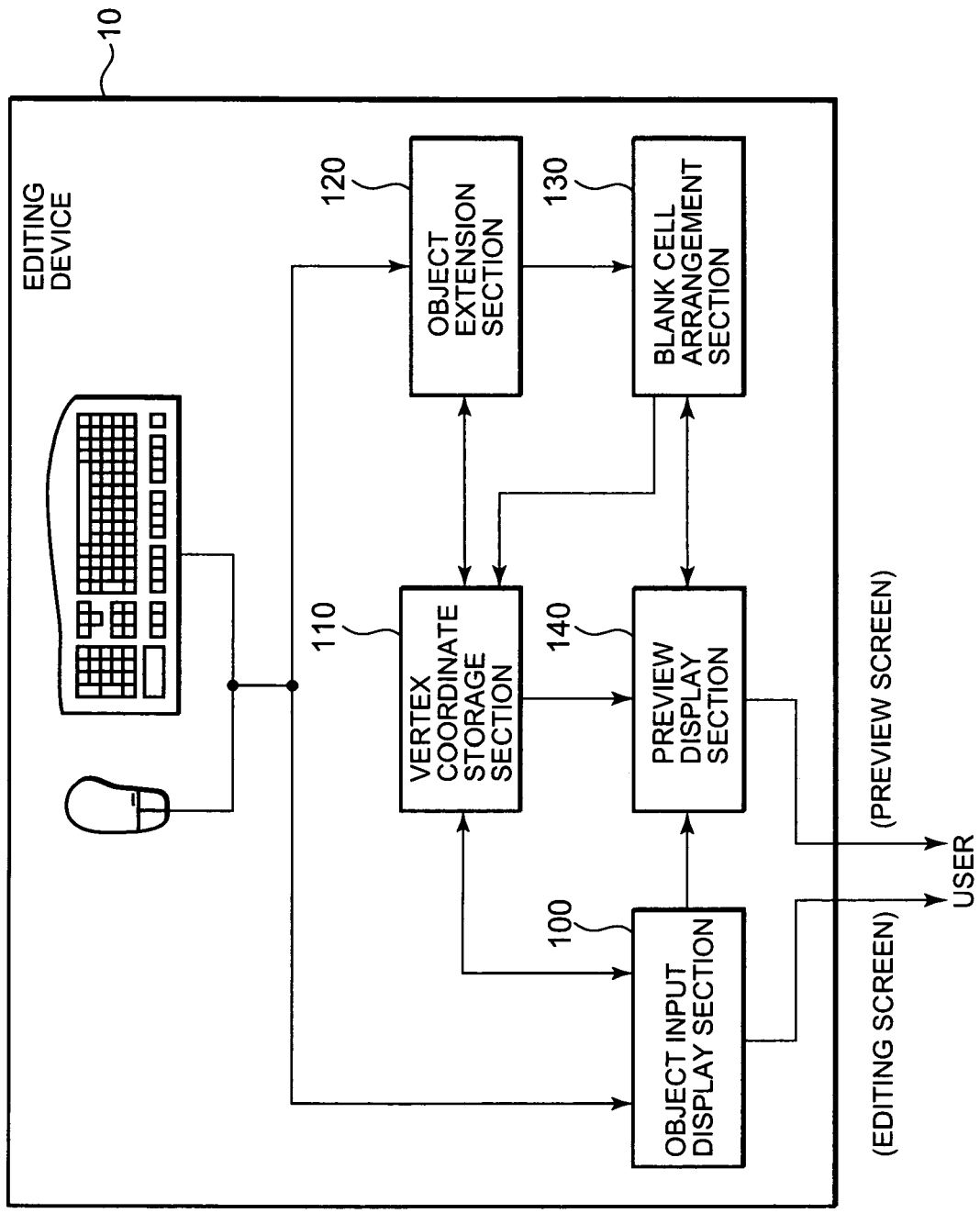
FIG. 1 is a functional block diagram showing a configuration of an editing apparatus.

FIG. 1 is a functional block diagram showing the configuration of an editing apparatus 10. The editing apparatus 10 has as one purpose the arrangement and display, in a table form on a screen, of a plurality of objects that are input by a user, without requiring a complicated operation by the user. The editing apparatus 10 includes an object input display section 100, a vertex coordinate storage unit 110, an object extension section 120, a blank cell arrangement section 130 and a preview display section 140.

The object input display section 100 permits a user, by manipulating a keyboard or a mouse, to enter a content for display in each cell of a table. Subsequently, the object input display section 100 displays as an object, on a predesignated editing screen, a rectangular area that includes the content input by the user. The vertex coordinate storage section 110 stores the coordinates of each vertex of the object displayed on the editing screen.

When a table creation instruction is received from a user, the object extension section 120 extends the external form of the first of a plurality of objects, displayed by the object input display section 100, within a limited range such that the first object does not overlap a second object. Specifically, the object extension section 120 changes the coordinates of the vertexes stored in the vertex coordinate storage section 110 so as to at least extend each object vertically or horizontally. The object extension section 120 also compares the coordinates of individual vertexes to determine object overlapping. The object extension section 120 then extends the external form of the first object, such that at least one side of the first object is superposed on one side of the second object or an extension line of that side.

Specifically, the object extension section 120 extends the external form of the first object, such that at least one side of the first object is in touch with one of the sides of the second object. Further, the object extension section 120 may perform a left side extension and alignment process by which the left sides of individual objects that are arranged along a straight line parallel to the vertical coordinate axis on the editing screen are superposed on an extension line of one of these left sides. As a result, the object extension section 120 can display, on the editing screen, a table wherein a cell corresponding to the first object and a cell corresponding to the second object are aligned.

The blank cell arrangement section 130 displays, on the predesignated screen areas where tables are to be displayed a blank cell which does not contain a content to be displayed, in an area other than those where cells corresponding to the individual objects aligned by the object extension section 120 are displayed. Each time the object input display section 100 receives a new operation for an object from a user, the preview display section 140 displays, on a preview screen, a complete image of a table obtained following the extension of a plurality of preexisting objects by the object extension section 120. In this case, the blank cell arrangement section 130 may insert a blank cell into the complete image of the table.

The operation the object input display section 100 receives from a user is an operation, for example, for arranging a new object upon the reception of a content to be displayed as the object. In addition, this operation may be an operation for moving, on the screen, preexisting objects that have already been input and arranged, or an operation for changing the external form of preexisting objects that have already been input and arranged.

Figure 2:
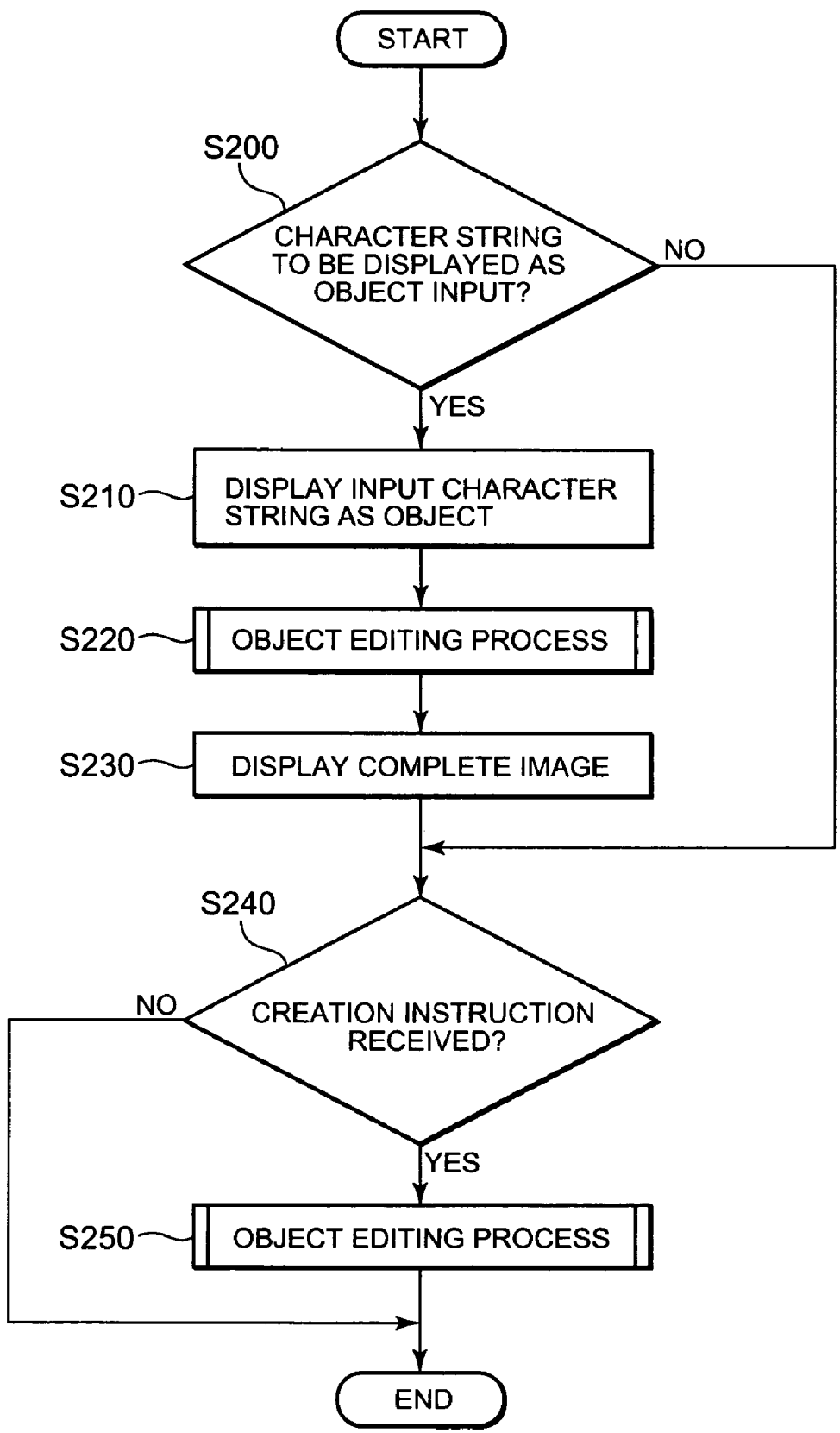
FIG. 2 is a flowchart showing the operation of the editing apparatus.

FIG. 2 is a flowchart showing the operation of the editing apparatus 10. Each time an instruction is received from a user, or periodically regardless of whether a user instruction has been input, the editing apparatus 10 performs the following processing. When a user has input a content (e.g., character strings) to be displayed in a cell of a table (YES at S200), the object input display section 100 displays the input character strings as objects (S210). Also, the preview display section 140 prepares a complete image of the table, using the object editing process (S220), and displays the complete image on a preview screen (S230).

When a table creation instruction is input by a user (YES at S240), the object extension section 120 performs the object editing process and aligns a plurality of objects displayed on the screen (S250). That is, when a table creation instruction has been received, the object extension section 120 extends the individual objects, creates a table displayed on the preview screen by the preview display section 140 and displays the table on an editing screen.

Figure 3:
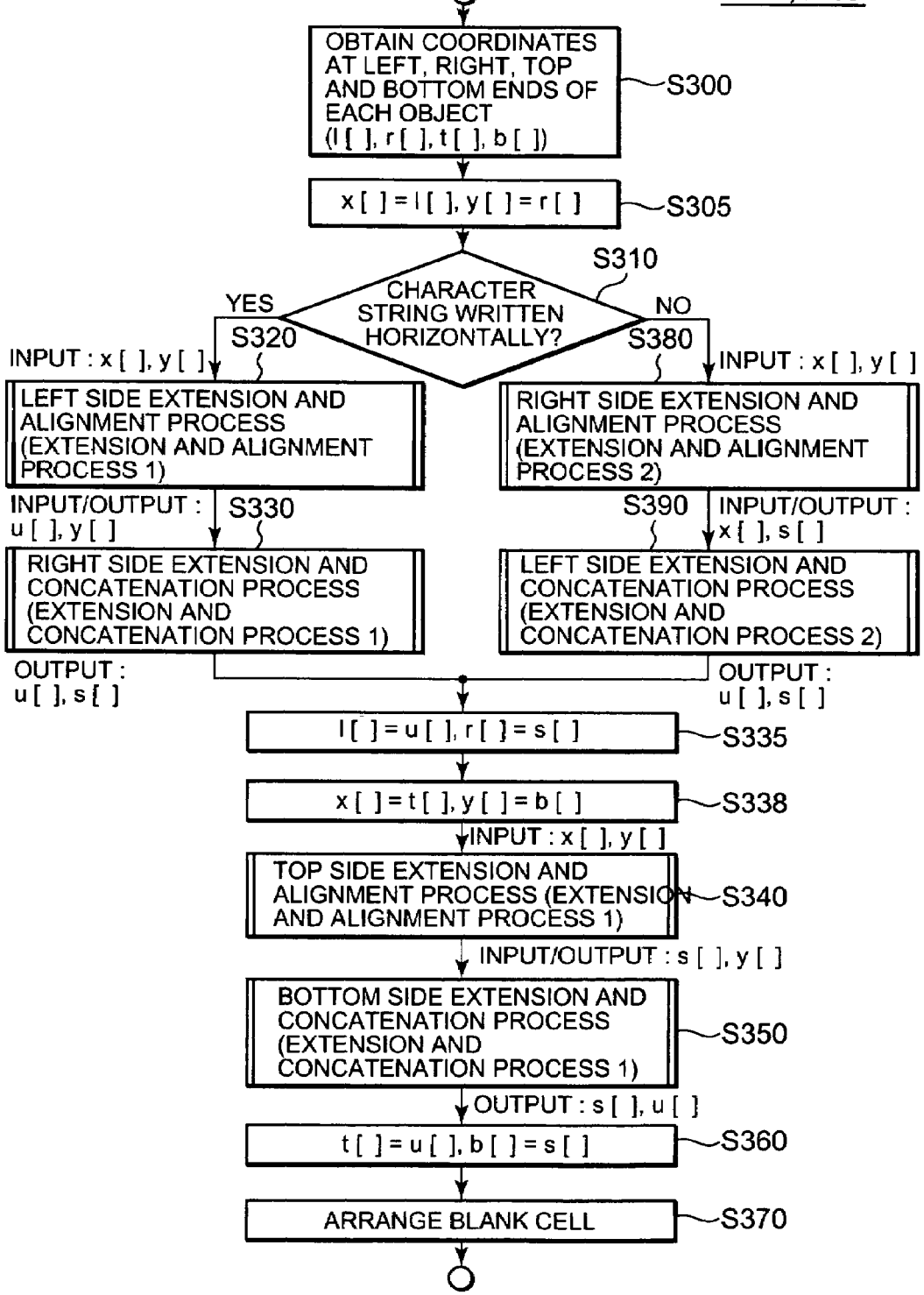
FIG. 3 is a detailed flowchart showing the object editing processing performed by an object extension section.

FIG. 3 is a detailed flowchart showing the object editing processing performed by the object extension section 120. The object extension section 120 obtains, from the vertex coordinate storage section 110, the X coordinates for the left and the right ends of the individual objects and the Y coordinates for the top and bottom ends of the objects (S300). In this case, variable l [ ] represents an array variable that stores the coordinates of the left end of each object. Similarly, variable r [ ], variable t [ ] and variable b [ ] are array variables that store the coordinates for the right end, the top end and the bottom end of each object. That is, the number of objects is denoted by n, the coordinates of the left end of the i-th object is denoted by l [i], the coordinates of the right end is denoted by r [i], the coordinates of the top end is denoted by t [i], and the coordinates of the bottom end is denoted by b [i]. Furthermore, in the following explanation, the i-th object is called an object i.

Next, the object extension section 120 copies the contents of l [ ] to a new array variable x [ ], and also copies the contents of an array variable r [ ] to a new array variable y [ ] (S305). Then, the object extension section 120 determines whether each object contains a horizontally written character string (S310). When the pertinent object contains a horizontally written character string (YES at S310), the object extension section 120 employs variable s x [ ] and y [ ] and performs the left side extension and alignment processing by which the left sides of a plurality of objects that are arranged along a straight line parallel to the vertical coordinate axis are superposed on the extension line of the left side of one of these objects (S320).

Following this, the object extension section 120 performs the right side extension and concatenation processing for extending the external form of an individual object, which is displayed entirely on the left of at least one of the objects obtained as a result of the left side extension and alignment processing, such that the right side of the extended object is superposed on the left side of at least one object or on the extension line of this left side (S330). At S330, for an object having no adjacent object on the right, the object extension section 120 superposes the right side of this object on the extension line for the right side of the rightmost object to be edited. Since the left side extension and alignment process entails the same processing as the top side extension and alignment process that will be described later, these two processes are collectively called extension and alignment processing type 1, and will be described in detail while referring to FIG. 4. Likewise, since the right side extension and concatenation process entails the same processing as the bottom side extension and concatenation process that will be described later, these two processes are collectively called extension and concatenation processing type 1, and will be described in detail while referring to FIG. 5.

When the object contains a vertically written character string (NO at S310), the object extension section 120 employs the variables x [ ] and y [ ], and performs the right side extension and alignment processing by which the right sides of a plurality of objects arranged along a straight line parallel to the vertical coordinate axis are superposed on the extension line of the right side of one of these objects (S380). This process is called extension and alignment processing type 2, so as to distinguish it from extension and alignment processing type 1.

Sequentially, the object extension section 120 performs the left side extension and concatenation processing, for extending the external form of an individual object that is displayed entirely on the right of at least one of the objects obtained as a result of the right side extension and alignment processing, such that the left side of the extended object is superposed on the right side of at least one object of the plurality of the objects, or on the extension line of this right side (S390). This process is called extension and concatenation processing type 2, so as to distinguish it from the extension and concatenation processing type 1. At S390, for an object having no adjacent object on the left, the object extension section 120 superposes the left side of this object on the extension line of the left side of the leftmost object to be edited. Thereafter, the object extension section 120 copies the contents of the variable u [ ] to the variable l [ ], and also copies the contents of the variable s [ ] to the variable r [ ] (S335). Therefore, the results obtained by the calculation of the coordinates of the extension destination are reflected on the actual coordinates of the objects.

In this manner, for a horizontally written character string, the left side of the object arranged by the user can be used as a reference, and for a vertically written character string, the right side of the object arranged by the user can be employed as a reference. Therefore, the reference position of the array can be changed in accordance with the contents input by the user. When each object contains a horizontally written character string for a language that is read from the right on the left, the object extension section 120 may perform the right side extension and alignment processing and left side extension and concatenation processing, instead of the above described processing.

Following this, the object extension section 120 copies the contents of the variable t [ ] to the variable x [ ], and copies the contents of the variable b [ ] to the variable y [ ] (S338). Then, the object extension section 120 employs the variables x [ ] and y [ ] and performs the top side extension and alignment processing, by which the top sides of a plurality of objects that are arranged along a straight line parallel to the horizontal axis are superposed on the extension line for the top side of one of these objects (S340).

Next, the object extension section 120 performs the bottom side extension and concatenation processing for extending the external form of an individual object that is entirely displayed above at least one of the objects obtained as a result of the top side extension and alignment processing, such that the bottom side of the extended object is superposed on the bottom side of the at least one object, or the extension line of this bottom side (S350). The object extension section 120 copies the contents of the variable u [ ] to the variable t [ ], and copies the contents of s [ ] to the variable b [ ] (S360). Therefore, the results obtained by the calculation of the coordinates of the extension destinations are reflected in the actual coordinates of the objects.

The blank cell arrangement section 130 displays, on the predesignated area, where tables are to be displayed, a blank cell which does not contain a content, in an area other than those where cells corresponding to the individual objects aligned by the object extension section 120 are displayed (S370). As a result, the external form of the entire table can be shaped, for example, into a rectangle.

Figure 4:
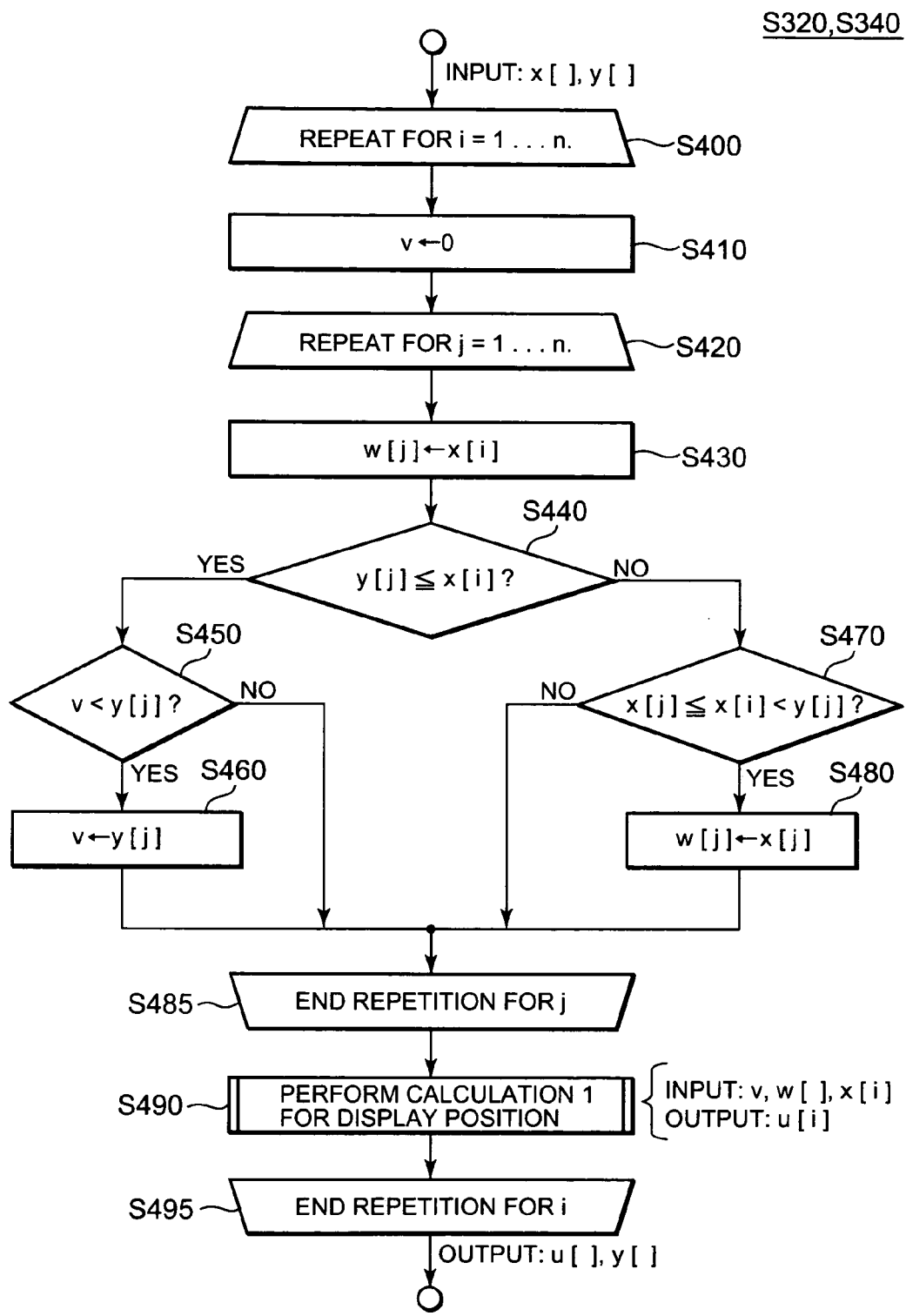
FIG. 4 is a detailed flowchart showing extension and alignment processing type 1 for aligning objects by extending the left sides or top sides of the objects.

FIG. 4 is a detailed flowchart showing the extension and alignment processing type 1 for alignment objects by extending the left sides or the top sides of the objects. The object extension section 120 employs the variables x [ ] and y [ ] as inputs and repeats the following process for a case where integers l to n are sequentially substituted for a new variable i (S400). First, the object extension section 120 substitutes 0 for a new variable v (S410). In this case, the variable v holds the coordinates of the right end of the object, the right side of which is the rightmost among the objects that have been subject to the determination up to this step and that are located entirely on the left of the object i.

In this embodiment, the editing screen and the preview screen are two-dimensional planes where axes in the horizontal and vertical directions are defined as coordinate axes. The direction on the right along the horizontal coordinate axis is defined as the positive direction, the direction in which the coordinate value is increased, and the direction on the left along the horizontal coordinate axis is defined as the negative direction, in which the coordinate value is reduced. The direction downward along the vertical coordinate axis is defined as the positive direction, the direction in which the coordinate value is increased, and the direction upward along the vertical coordinate axis is defined as the negative direction, the direction in which the coordinate value is reduced. Further, each coordinate value is defined as an integer equal to or greater than 0. That is, at S410, the object extension section 120 substitutes for the variable v the leftmost coordinates on the coordinate plane.

Next, the object extension section 120 repeats the following process for a case where integers 1 to n are substituted for a new variable j (S420). First, the object extension section 120 substitutes x [i] for w [j] with respect to a new array variable w [ ] (S430). Then, the object extension section 120 determines whether y [j]≦x [i] has been satisfied (S440). That is, the object extension section 120 determines whether the entire object j is located on the left of the object i.

When y [j]≦x [i] has been satisfied (YES at S440), the object extension section 120 determines whether v<y [j] has been established (S450). That is, the object extension section 120 determines whether the right side of the object j is located on the right of the right side of any object that has been subject to determination, and is located entirely on the left of the object i. When v<y [j] has been established (YES at S450), the object extension section 120 substitutes y [j] for v (S460). By repeating this process, the variable v will hold the coordinates of the right end of an object, the right end of which is the rightmost among the objects that are located entirely on the left of the object i.

When y [j]≦x [i] has not been satisfied (NO at S440), the object extension section 120 determines whether x [j]≦x [i]<y [j] has been established (S470). That is, the object extension section 120 determines whether the object j and the object i are arranged along a straight line parallel to the vertical coordinate axis, and whether the left side of the object j is located on the left of the left side of the object i. When this condition has been satisfied, the object j is a candidate used for alignment the left side of the object i. When x [j]≦x [i]<y [j] has been satisfied (YES at S470), the object extension section 120 substitutes x [j] into w [j] (S480).

The object extension section 120 repeats the above described processing each time the integer 1 to n is substituted for the variable j (S485). Then, the object extension section 120 employs the variables v and w [ ] that it acquired and the x [i] to calculate positions where aligned objects are to be displayed (S490). The object extension section 120 repeats this process each time the integers 1 to n is substituted for the variable i (S495). As a result, the coordinates of the left side of each object that is aligned are stored in the array variable u [ ]. The variable y [ ] is output unchanged, as it was input.

Figure 5:
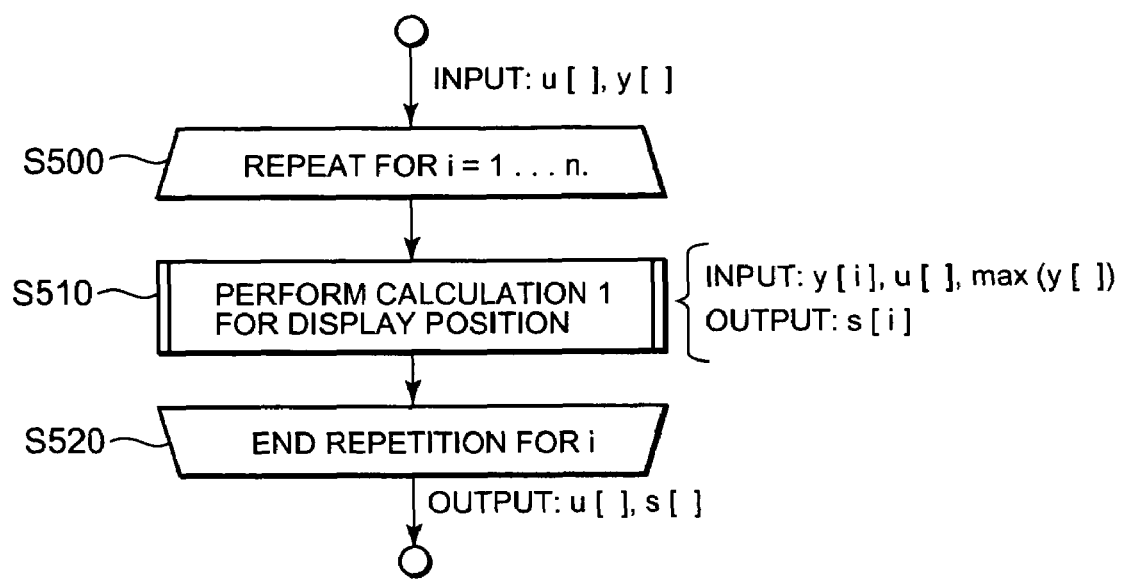
FIG. 5 is a detailed flowchart showing extension and concatenation processing type 1 for extending right sides or bottom sides of objects.

FIG. 5 is a detailed flowchart showing the extension and concatenation processing type 1 for extending the right side or the bottom side of an object. The object extension section 120 employs the variables u [ ] and y [ ], and repeats the following processing when the integers 1 to n are sequentially substituted for a new variable i (S500). The object extension section 120 employs the y [i], the obtained u [ ], and the maximum value of y [ ] to calculate the position where the right side or the bottom side is to be displayed as the result of the extension of the object i (S510). The obtained display position is defined as s [i]. The object extension section 120 repeats this process when the integers 1 to n are sequentially substituted for the variable i (S520).

Figure 6:
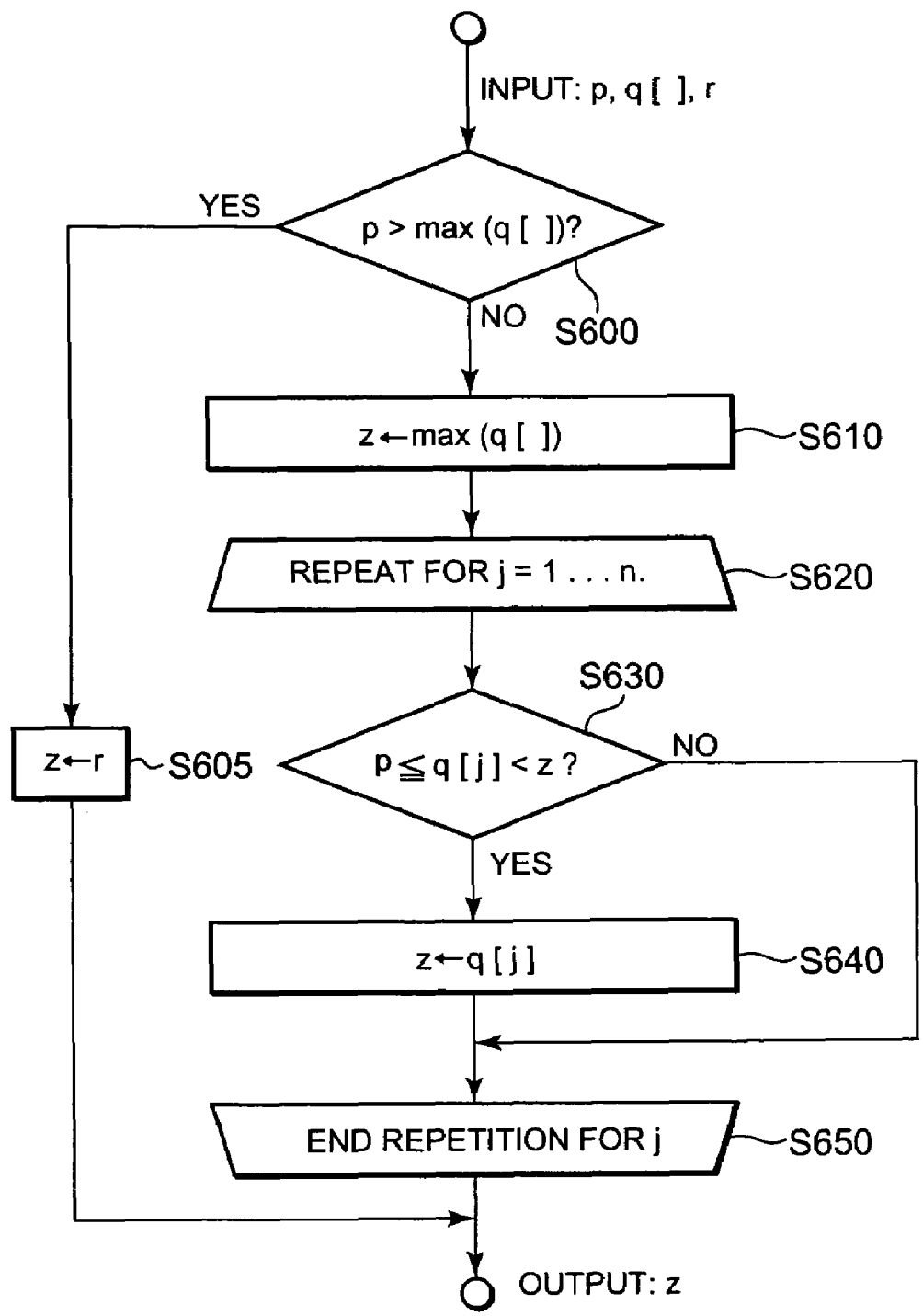
FIG. 6 is a detailed flowchart showing the processing performed to calculate a display position.

FIG. 6 is a detailed flowchart showing the processing for calculating the display position. The object extension section 120 employs a variable p, an array variable q [ ] and a variable r as inputs. That is, v, w [ ] and x [i] at S490, or y [i], u [ ] and the maximum value of y [ ] at S510 are substituted for the variable p, the array variable q [ ] and the variable r, respectively.

During this processing, first, the object extension section 120 determines whether p>max (q [ ]) has been satisfied (S600). That is, at S490, the object extension section 120 determines whether there is another object that is a candidate as a destination with which the left side of the object i is to be aligned. At S510, the object extension section 120 determines whether a blank for extending the object i is present on the right of the object i until it reaches another object.

When p>max (q [ ]) has been satisfied (YES at S600), the object extension section 120 copies the content of the variable r to a new variable z (S605). Since the variable z in the process at S490 is a variable for holding the coordinates obtained after the completion of the extension and alignment process, the extension and alignment process is not performed in this case. On the other hand, in the process at S510, the right side of the object i can be superposed on the extension line of the right side of the object located in the rightmost position of all the objects to be edited. When p>max (q [ ]) has not been satisfied (NO at S600), the object extension section 120 substitutes the maximum value of q [ ] for the new variable z (S610) and repeats the following process when integers 1 to n are sequentially substituted for the variable j (S620).

The object extension section 120 determines whether p [q [j]<z has been satisfied (S630). When p [q [j ]<z has been satisfied (YES at S630), the object extension section 120 substitutes q [j] for the variable z (S640). The object extension section 120 repeats the above mentioned processing when the integers 1 to n are sequentially substituted for the variable j (S650).

Through this processing, at S490, the object extension section 120 obtains the coordinates z of the left side of the object that is displayed on the right of the right ends of the other objects, and the left side of which is positioned in the leftmost location among the plurality of objects vertically arranged along the same straight line as the object i. Further, at S510, the object extension section 120 can obtain the coordinates z of the right side of the object i that is in touch with the other object located on the right of the object i, or the coordinates z of the right side of the rightmost object among all those to be edited.

Since for descriptions of the top side extension and alignment processing and the bottom side extension and concatenation processing, the terms left and right and left side and right side included in the explanations given while referring to FIGS. 4 to 6 need only be replaced by the terms top and bottom and top side and bottom side, no detailed explanation for them will be given.

Figure 7:
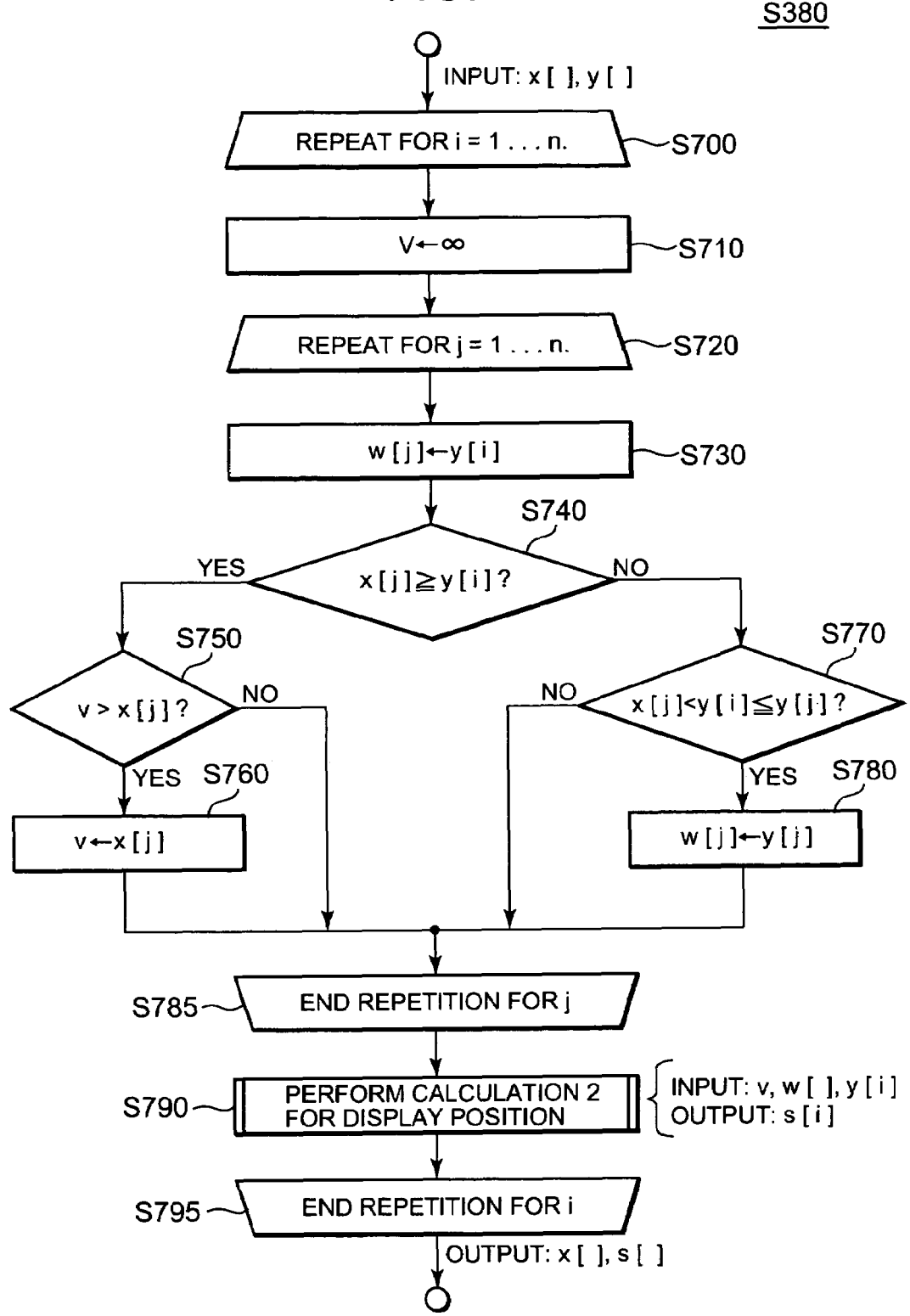
FIG. 7 is a detailed flowchart showing extension and alignment processing type 2 for aligning objects by extending the right sides of the objects.

FIG. 7 is a detailed flowchart showing the extension and alignment processing type 2 for alignment objects by extending the right sides of objects. The object extension section 120 employs the variables x [ ] and y [ ] as inputs, and repeats the following processing when the integers 1 to n are sequentially substituted for a new variable i (S700). First, the object extension section 120 substitutes an infinite value for a new variable v (S710). In this case, the variable v holds the coordinates of the left end of the object whose left side is at the leftmost location among the objects that has been subject to determination up to this step and that are located entirely on the right of the object i. In this embodiment, since it is premised that for each coordinate value there is a definite top limit, the object extension section 120 may substitute, for the variable v, a predesignated value equal to or greater than the top limit coordinate value.

Next, the object extension section 120 repeats the following process when the integers 1 to n are sequentially substituted for a new variable j (S720). First, the object extension section 120 substitutes y [i] for a new array variable w [ ] (S730). Then, the object extension section 120 determines whether x [j]≧y [i] has been satisfied (S740), i.e., whether the entire object i is located on the right of the object j.

When x [j]≧y [i] has been satisfied (YES at S740), the object extension section 120 determines whether v>x [j] has been satisfied (S750). That is, the object extension section 120 determines whether the left side of the object j is located on the left of the left side of each object that is located entirely on the right of the object i that has been subject to determination. When v>x [j] has been satisfied (YES at S750), the object extension section 120 substitutes x [j] for the variable v (S760). By repeating this process, the variable v will hold the coordinates of the left end of the object, the left side of which is at the leftmost location, among the objects that are located entirely on the right of the object i.

When x [j]≧x [i] has not been satisfied (NO at S740), the object extension section 120 determines whether x [j]<y [i]≦y [j] has been satisfied (S770). That is, the object extension section 120 determines whether the object j and the object i are arranged along the straight line parallel to the vertical coordinate axis, and the right side of the object j is located on the right of the right side of the object i. When this condition has been satisfied, the object j is a candidate to be used for alignment the right side of the object i. When x [j]<y [i]≦y [j] has been satisfied (YES at S770), the object extension section 120 substitutes y [j] for w [j] (S780).

The object extension section 120 repeats the above processing when the integers 1 to n are sequentially substituted for the variable j (S785). Then, the object extension section 120 employs the obtained variables v and w [ ] and y [i] to calculate the positions where the aligned objects are to be displayed (S790). The object extension section 120 repeats the above described processing when the integers 1 to n are sequentially substituted for the variable i (S795). As a result, the coordinates of the right sides of the objects that have been aligned are stored in the array variable u [ ]. The variable x [ ] is output unchanged, as it was input.

Figure 8:
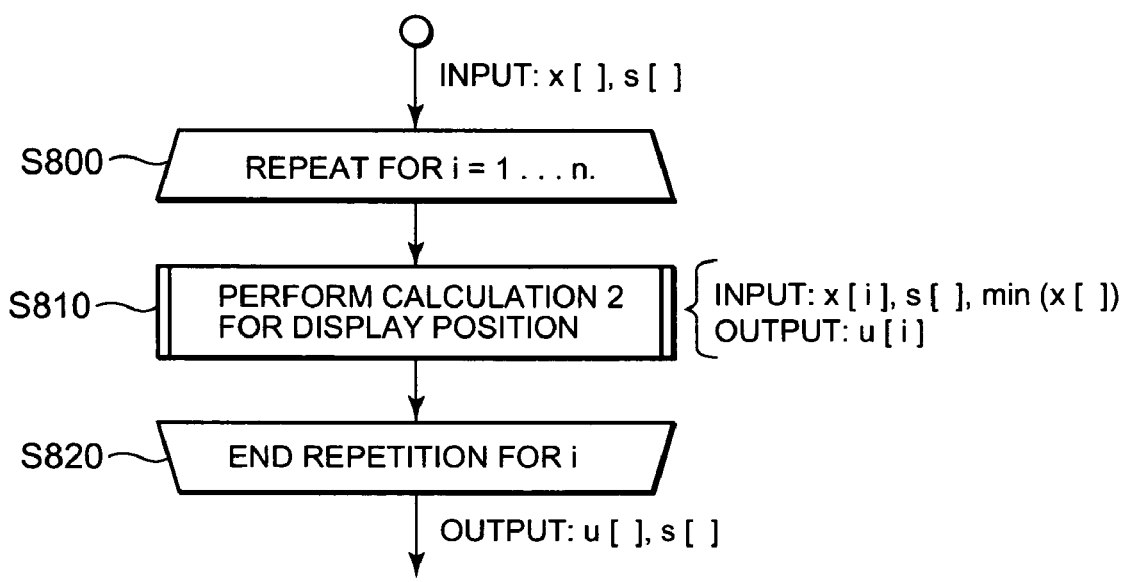
FIG. 8 is a detailed flowchart showing extension and concatenation processing type 2 for extending the left sides of objects.

FIG. 8 is a detailed flowchart showing the extension and concatenation processing type 2 performed to extend the left side of the object. The object extension section 120 employs the variables x [ ] and s [ ] as inputs, and repeats the following processing when the integers 1 to n are sequentially substituted for a new variable i (S800). The object extension section 120 employs x [i], the obtained values of s [ ] and the minimum value of x [ ] to calculate the positions where the left side is to be displayed as a result of extension of the object i (S810). The obtained display position is defined as u [i]. The object extension section 120 repeats this process when the integers 1 to n are substituted for the variable i (S820).

Figure 9:
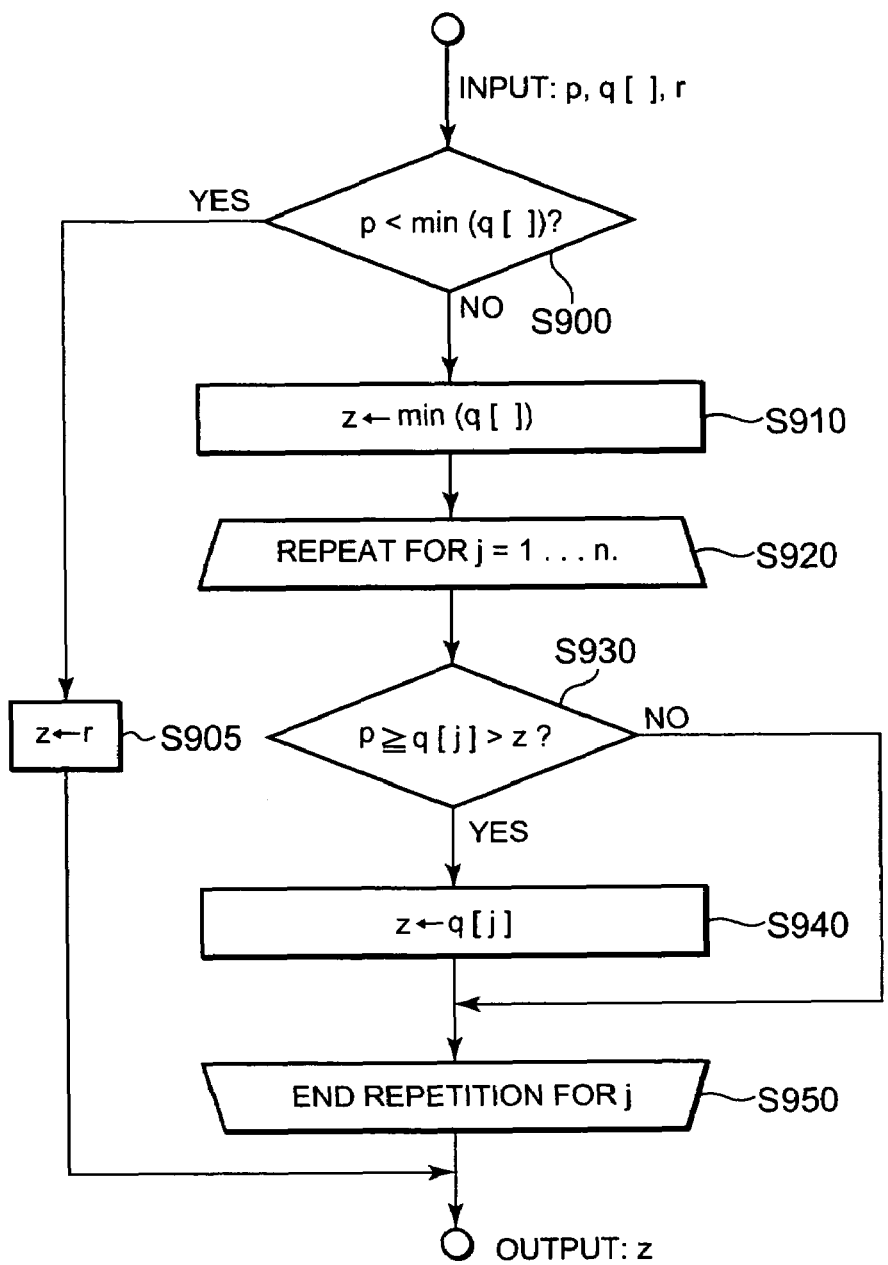
FIG. 9 is a detailed flowchart showing processing performed to calculate a display position.

FIG. 9 is a detailed flowchart showing the processing performed to calculate the display position. The object extension section 120 employs a variable p, an array variable q [ ] and a variable r as inputs. That is, v, w [ ] and y [i] at S790, or x [i], s [ ] and the minimum value of x [ ] at S810 are substituted for the variable p, the array variable q [ ] and the variable r, respectively.

During this processing, first, the object extension section 120 determines whether p<min (q [ ]) has been satisfied (S910). That is, at S790, the object extension section 120 determines whether there is another object that is a candidate as a destination with which the right side of the object i is to be aligned. At S810, the object extension section 120 determines whether a blank, for extending the object i, is present on the left of the object i until it reaches another object.

When p<min (q [ ]) has been satisfied (YES at S900), the object extension section 120 copies the content of the variable r to a new variable z (S605). Since the variable z in the process at S790 is a variable for holding the coordinates obtained after the completion of extension and alignment process, the extension and alignment process is not performed in this case. On the other hand, in the process at S810, the left side of the object i can be superposed on the extension line of the left side of the leftmost object among all the objects to be edited. When p<min (q [ ]) has not been satisfied (NO at S900), the object extension section 120 substitutes the minimum value of q [ ] for a new variable z (S910). The object extension section 120 repeats the following processing when the integers 1 to n are sequentially substituted for the variable j (S920).

The object extension section 120 determines whether p≧q [j]>z (S930) has been satisfied. When p≧q [j]>z has been satisfied (YES at S930), the object extension section 120 substitutes q [j] for the variable z (S940). The object extension section 120 repeats the abovementioned process when the integers 1 to n are sequentially substituted for the variable j (S950).

As a result, at S790, the object extension section 120 can obtain the coordinates z of the right side of the object, that is displayed on the left of the left ends of the other objects, and the left side of which is positioned in the leftmost location among the plurality of objects arranged along the same vertical straight line as the object i. Furthermore, at S810, the object extension section 120 can obtain the coordinates z of the left side of the object i that is in touch with the other object located on the left of the object i, or the coordinates z of the left side of the leftmost object of all those to be edited.

As is described above, the object extension section 120 performs the extension and alignment processing and the extension and concatenation processing for each of the objects to create a table where cells corresponding to the individual objects are presented on the editing screen. The processes explained while referring to FIGS. 3 to 9 may be performed by the preview display section 140 instead of the object extension section 120. Since the processing performed by the preview display section 140 is substantially the same as that performed by the object extension section 120, no further explanation for it will be given.

Figure 10A:
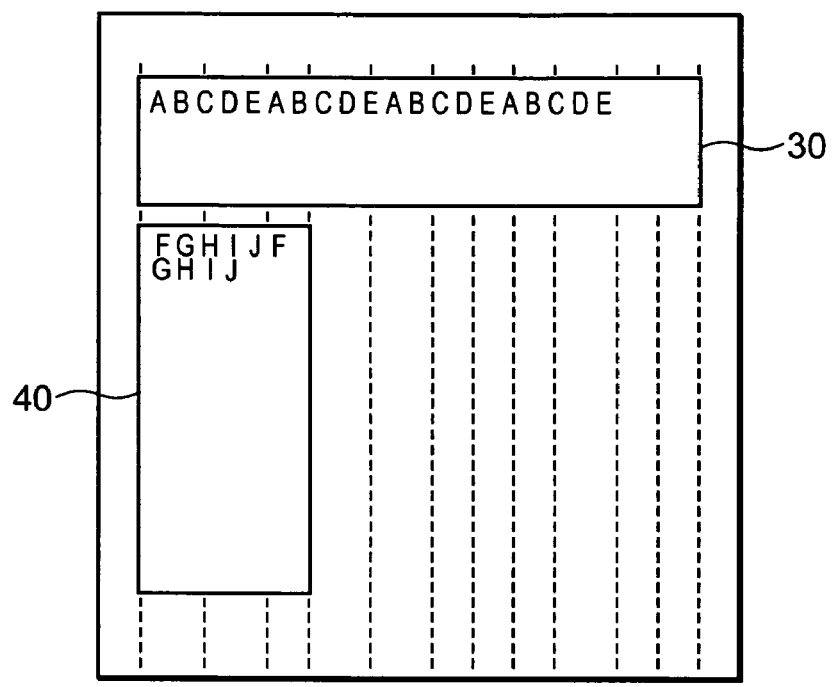
FIG. 10 is a diagram showing an example of an editing screen and an example of a preview screen displayed when a user has input an object.
Figure 10B:
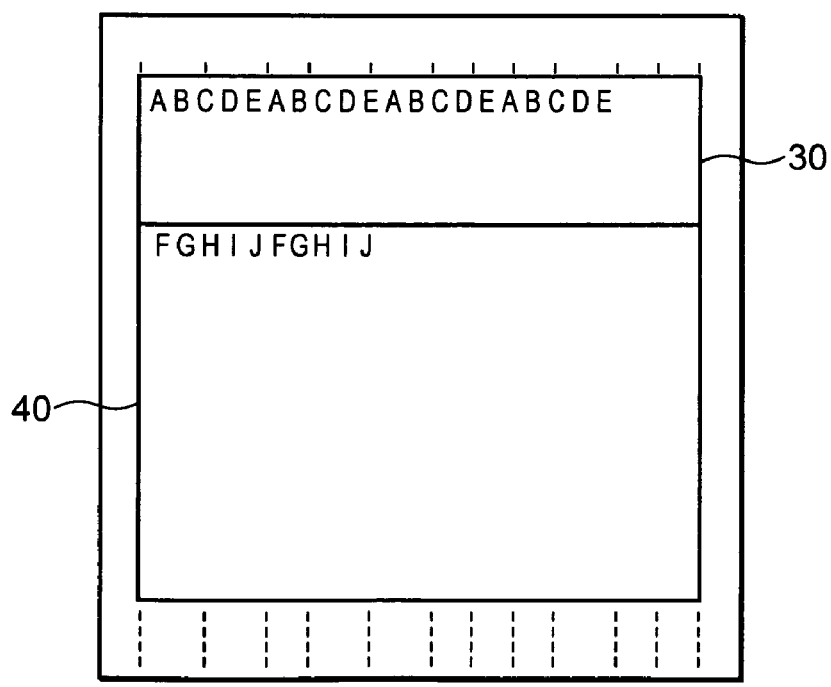

FIGS. 10A and 10B are diagrams showing an example of an editing screen and an example of a preview screen displayed when a user has input an object 40. The editing screen in FIG. 10A shows the editing screen displayed by the object input display section 100. In FIG. 10B, a complete image of a table is displayed on the preview screen by the preview display section 140. The complete image of the table may be a table created by the object extension section 120, or digest information prepared by reducing the size of the table. The preview screen is, for example, a screen displayed in a window different from the editing screen by a system that employs a window system as a GUI. Instead, the preview screen may be displayed within the editing screen. Since this explanation also applies to FIGS. 11 to 15, the explanation will not be repeated for those figures.

When an object 30 is displayed on the editing screen, the object input display section 100 receives an input of an object 40 from a user, and displays the object 30 and the object 40 on the editing screen. As a result, the object input display section 100 displays the object 30 and the object 40 with a gap between them. These objects are rectangles having the same vertical and horizontal directions.

Since the object input display section 100 has received the input of the new object 40 from the user, the preview display section 140 displays on the preview screen a complete image of a table that will be obtained by extending the objects. For example, by extending the external form of the object 30, the bottom side of the object 30 is superposed on the top side of the object 40. Also, by extending the external form of the object 40, the right side of the object 40 is superposed on the extension line of the right side of the object 30, which is at the rightmost location of all the objects to be edited. As is described above, when a user arranges a plurality of objects in a way that there are gaps between them, these objects can be extended such that the gaps are filled and the objects are arranged in a table form.

Figure 11A:
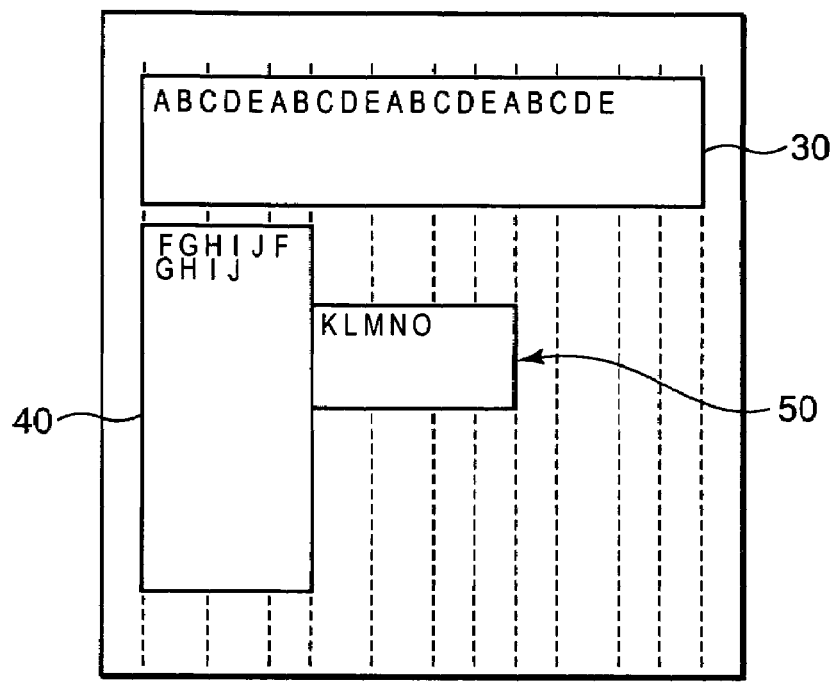
FIG. 11 is a diagram showing an example of an editing screen and an example of a preview screen displayed when the user has input another object.
Figure 11B:
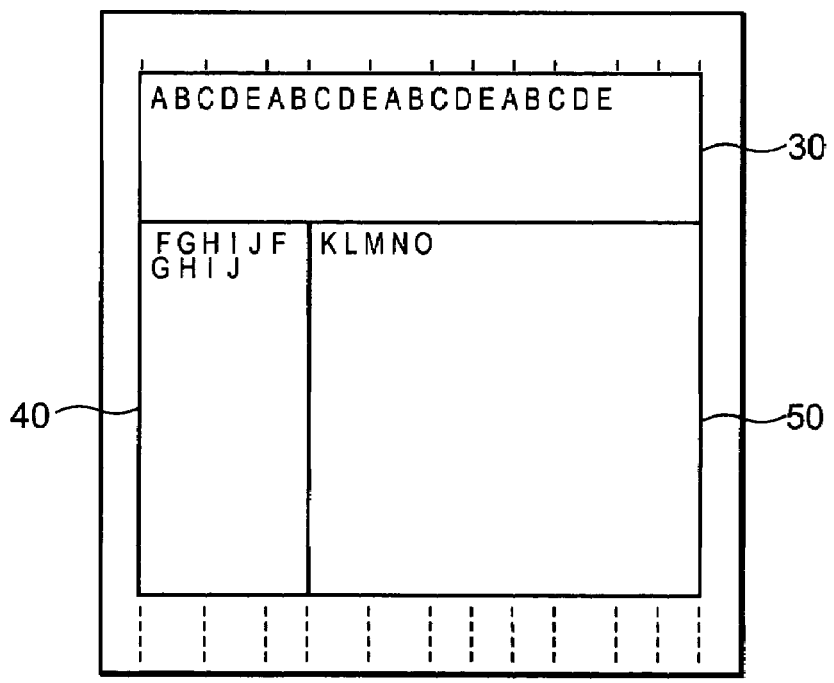

FIGS. 11A and 11B are diagrams showing an example of an editing screen and an example of a preview screen displayed when a user has input an object 50. When the object 30 and the object 40 are displayed on the editing screen, and when the object input display section 100 receives the input of the object 50 from the user, the object input display section 100 displays these objects 30, 40 and 50 on the editing screen.

As a result, the object input display section 100 displays the objects 30, 40 and 50 with intervening gaps, for example, between the objects 30 and 40 and between the objects 30 and 50. Further, the top side of the object 40 and the top side of the object 50 are not aligned along the same straight line.

On the other hand, since the object input display section 100 has received the input of the new object 50 from the user, the preview display section 140 displays on the preview screen a complete image of a table that will be obtained by extending the objects.

For example, by extending the external form of the object 30, the bottom side of the object 30 touches the top side of the object 40. And by extending the external form of the object 50, the right side of the object 50 is aligned with the extension line of the right side of the object 30, the right side of which is at the rightmost location among all the objects to be edited. Furthermore, the top side of the object 50 is aligned with the extension line of the top side of the horizontally adjacent object 40. As is described above, when a user arranges a plurality of objects separated by gaps, these objects can be extended to fill the gaps and to be arranged in a table form. In addition, when the sides of the objects are not aligned with a straight line, the objects can be so arranged as to superpose the sides on the same straight line.

Figure 12A:
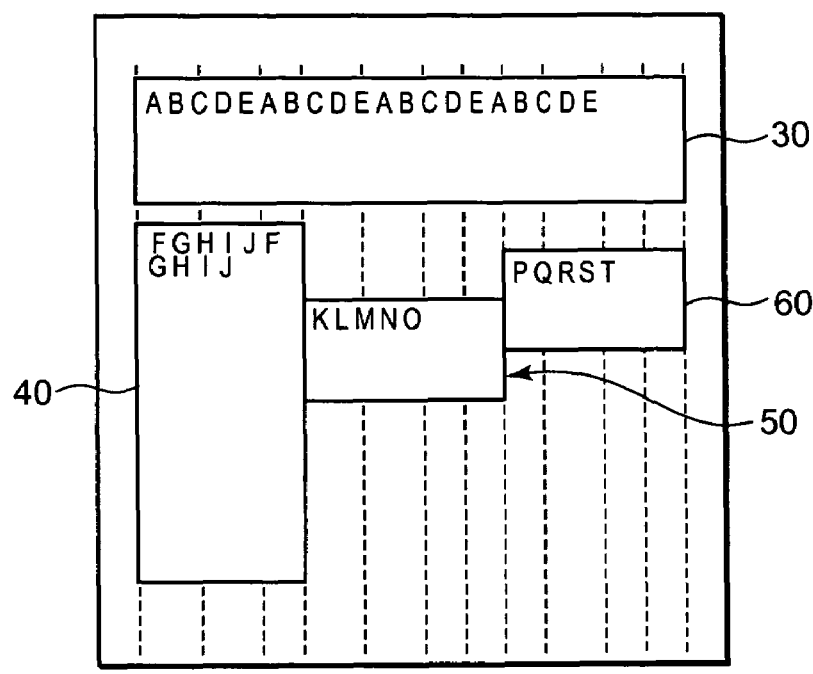
FIG. 12 is a diagram showing an example of an editing screen and an example of a preview screen displayed when the user has input an additional object.
Figure 12B:
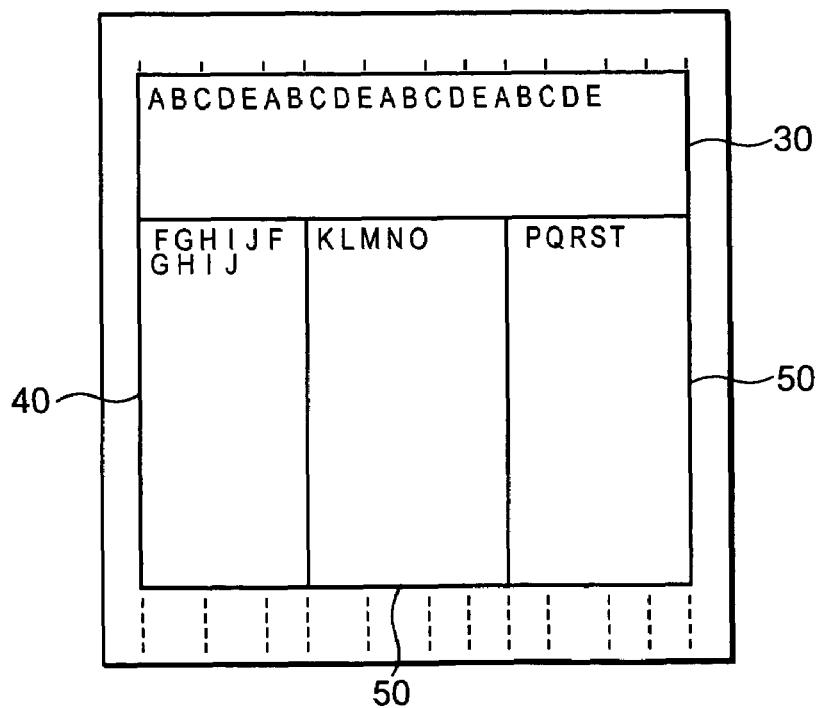

FIGS. 12A and 12B are diagrams showing an example of an editing screen and an example of a preview screen displayed when a user has input an object 60. When the objects 30, 40 and 50 are displayed on the editing screen, and the object input display section 100 receives the input of the object 60 from the user, the object input display section 100 displays the objects 30, 40, 50 and 60 on the editing screen.

As a result, the individual objects are displayed with intervening gaps between, for example, the objects 30 and 40, between the objects 30 and 50 and between the objects 30 and 60. Further, the top sides of the objects 40, 50 and 60 are not aligned with the same straight line.

On the other hand, since the object input display section 100 received the input of the new object 60 from the user, the preview display section 140 displays on the preview screen a complete image of a table that will be obtained by extending the objects. For example, by extending the external form of the object 30, the bottom side of the object 30 touches the top side of the object 40. The top side of the object 50 is supposed on the extension line of the top side of the horizontally adjacent object 40. Likewise, the top side of the object 60 is superposed on the extension line of the top side of the horizontally adjacent object 40.

It is conceivable that the top side of the object 50 may be superposed on the extension line of the top side of either the object 60 or the object 40. However, when the top side of the object 50 is superposed on the extension line of the top side of the object 60, the object 40 would not be aligned with the objects 50 and 60. Therefore, it is preferable that the object extension section 120 superpose the top side of the object 40 on the extension line of the top side of the object 40, the top side of which is at the topmost location among all the objects arranged along the horizontal straight line. As a result, still more objects can be arranged along the same straight line.

Figure 13A:
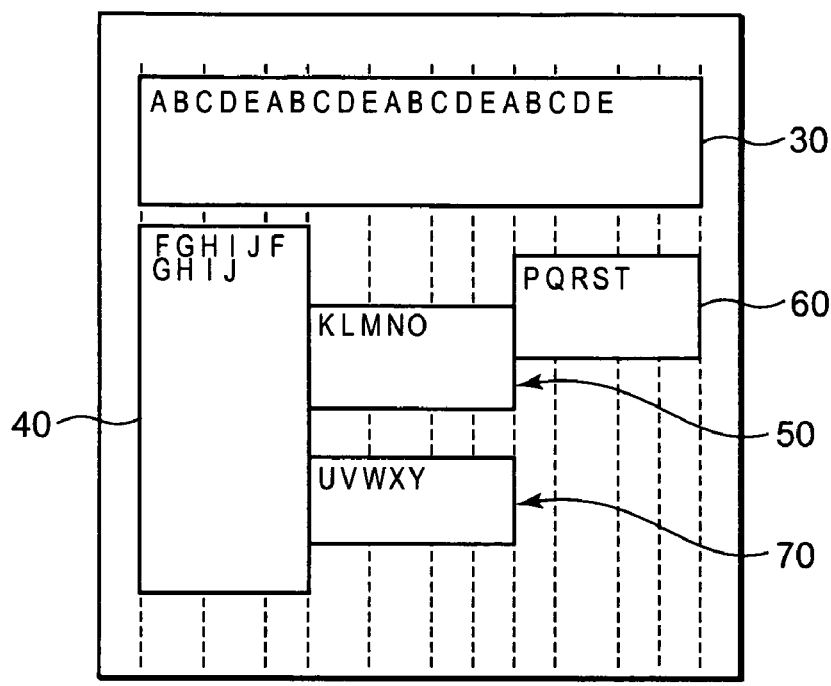
FIG. 13 is a diagram showing an example of an editing screen and an example of a preview screen displayed when the user has input still another object.
Figure 13B:
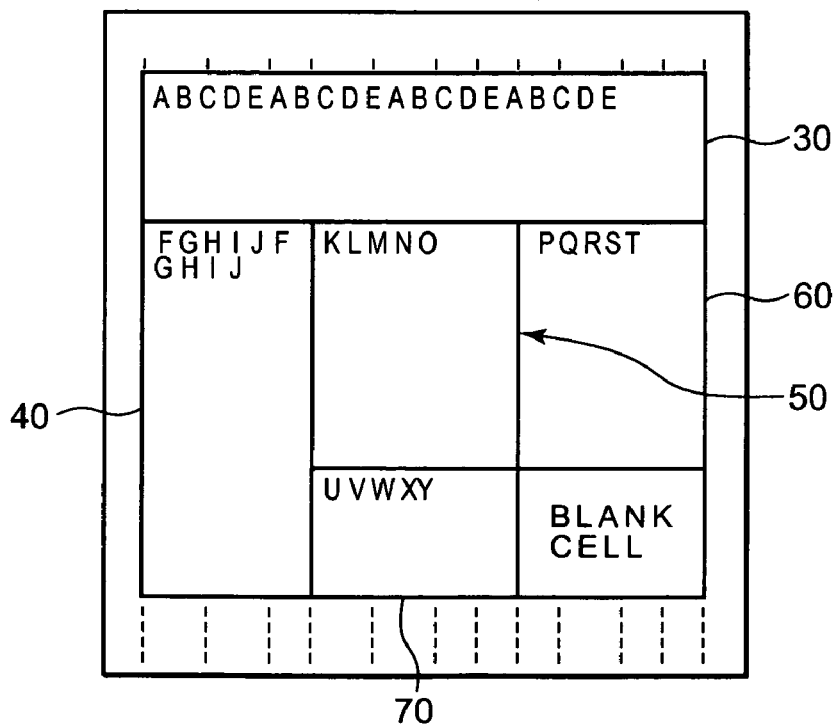

FIGS. 13A and 13B are diagrams showing an example of an editing screen and an example of a preview screen displayed when a user has input an object 70. When the objects 30, 40, 50 and 60 are displayed on the editing screen, and the object input display section 100 receives the input of the object 70 from the user, the object input display section 100 displays the objects 30, 40, 50, 60 and 70 on the editing screen.

As a result, these objects are displayed, for example, with gaps between the objects 30 and 40, between the objects 30 and 50 and between the objects 30 and 60. Furthermore, the top sides of the objects 40, 50 and 60 are not aligned with the same straight line. Futhermore, there is a blank between the objects 50 and 70.

On the other hand, since the object input display section 100 has received the input of the new object 70 from the user, the preview display section 140 displays on the preview screen a complete image of a table that will be obtained by extending the objects. For example, when the external form of the object 30 is extended, the bottom side of the object 30 touches the top side of the object 40. The top side of the object 50 is superposed on the extension line of the top side of the horizontally adjacent object 40. Likewise, the top side of the object 60 is superposed on the extension line of the top side of the horizontally adjacent object 40.

The bottom side of the object 50 touches the top side of the object 70. However, since the bottom side of the object 60 is above the top side of the object 70, the bottom side of the object 60 is extended only up to the extension line of the top side of the object 70. Similarly, since the right side of the object 70 is on the left of the left side of the object 60, the right side of the object 70 is extended only up to the extension line of the left side of the object 60. Therefore, an area, other than areas where cells corresponding to the arranged objects are displayed, is generated on the editing screen where a table is to be displayed.

Thus, it is preferable that the blank cell arrangement section 130 display, in an area other than the areas where cells are displayed, a blank cell that does not include a content to be displayed. Therefore, the external form of the entire table can be shaped, for example, into a rectangle.

Figure 14A:
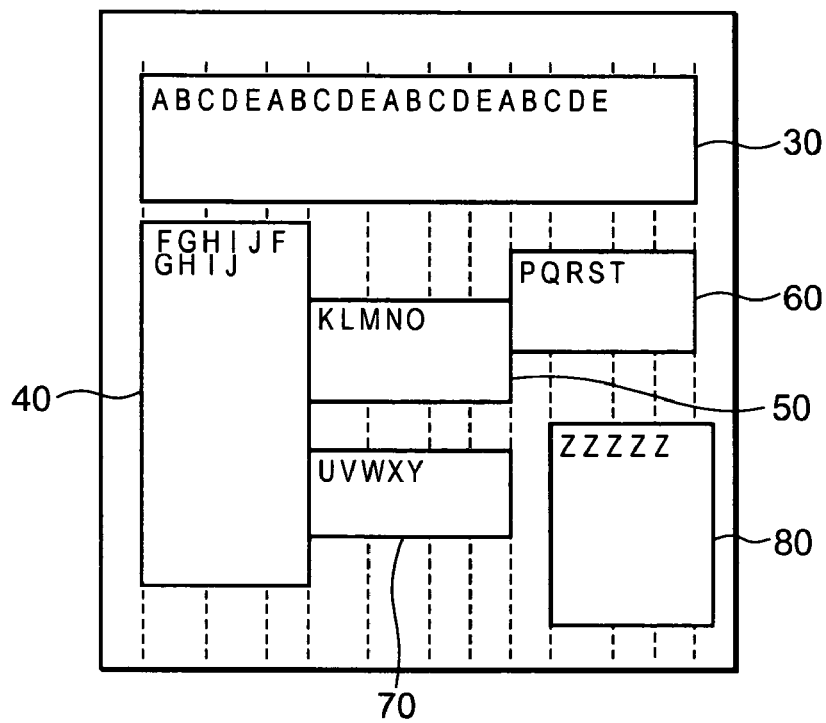
FIG. 14 is a diagram showing an example of an editing screen and an example of a preview screen displayed when the user has input one more object.
Figure 14B:
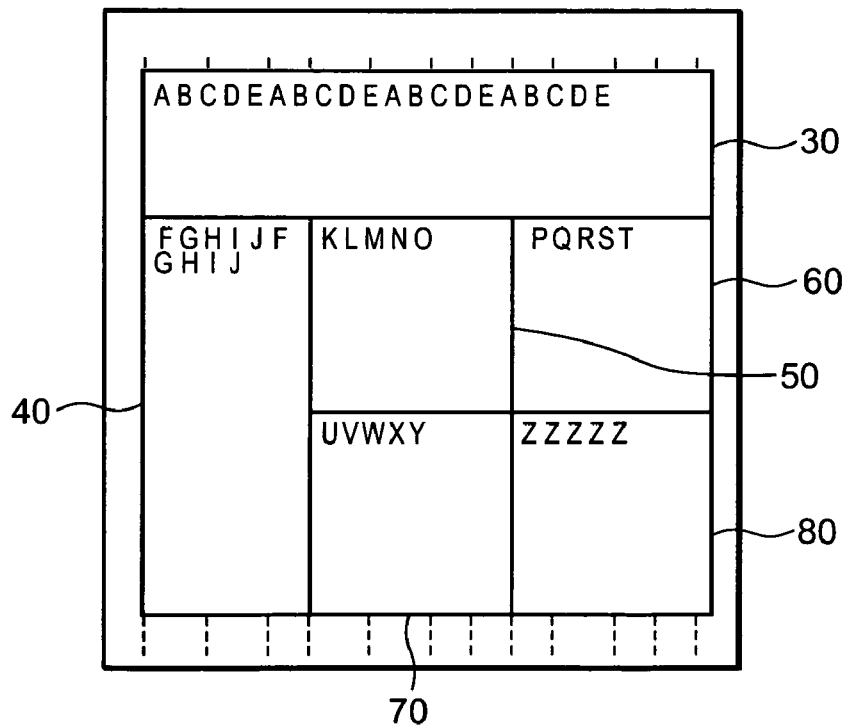

FIGS. 14A and 14B are diagrams showing an example of an editing screen and an example of a preview screen displayed when a user has input an object 80. When the objects 30, 40, 50, 60 and 70 are displayed on the editing screen, and the object input display section 100 receives the input of the object 80 from the user, the object input display section 100 displays the objects 30, 40, 50, 60, 70 and 80 on the editing screen.

As a result, these objects are displayed with intervening gaps between, for example, the objects 30 and 40, between the objects 30 and 50 and between the objects 30 and 60. Furthermore, the top sides of the objects 40, 50 and 60 are not aligned with the same straight line. Moreover, there are blanks between the objects 50 and 70 and between the objects 60 and 80.

On the other hand, since the object input display section 100 has received the input of the new object 80 from the user, the preview display section 140 displays on the preview screen a complete image of a table that will be obtained by extending the objects. For example, when the external form of the object 30 is extended, the bottom side of the object 30 touches the top side of the object 40.

The top side of the object 50 is superposed on the extension line of the top side of the horizontally adjacent object 40. Likewise, the top side of the object 60 is superposed on the extension line of the top side of the horizontally adjacent object 40. In addition, the top side of the object 70 is superposed on the extension line of the top side of the object 80 arranged along the same horizontal straight line, and the left side of the object 80 is superposed on the left side of the object 60 that is arranged along the same vertical straight line. The bottom sides of the objects 40 and 70 are superposed on the extension line of the bottom side of the object 80.

As is shown in FIGS. 10 to 14, the editing apparatus 10 of this embodiment can align individual objects by using as references the locations of the sides in a predetermined direction, and can extend the objects so as to fill gaps between the objects. At this time, the reference positions for alignment are automatically determined based on the positions of the objects as originally arranged. The burden of operation imposed on a user is therefore very small. Further, an appropriately simple layout can be employed while the positions where the user has arranged the objects are reflected in the table. In addition, each time a user inputs a new object, the user can check a complete image of a table on the preview screen, provided separately from the editing screen where the objects are actually arranged. Therefore, failures in the creation of tables can be avoided, and work efficiency can be improved.

Figure 15:
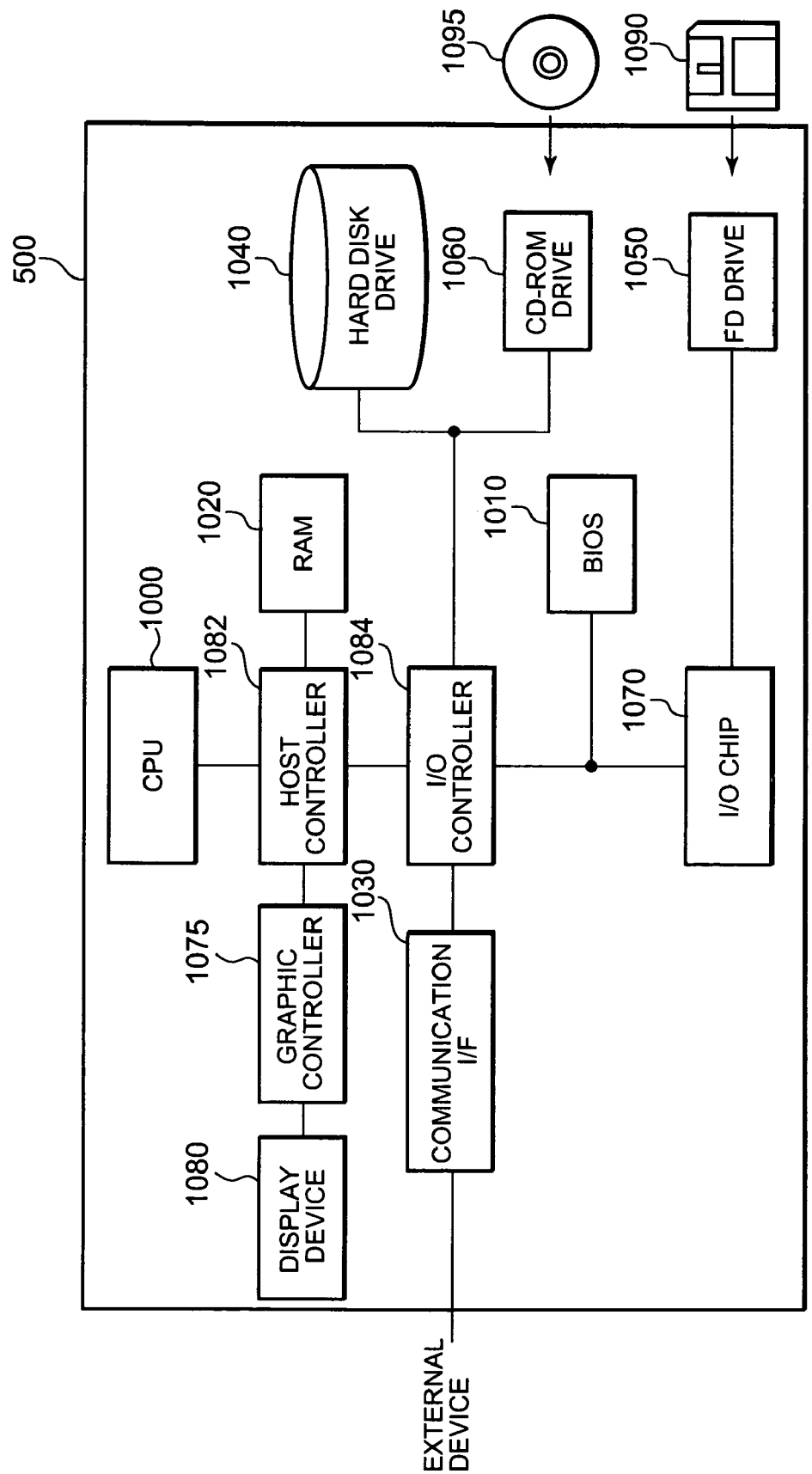
FIG. 15 is a diagram showing an example of hardware configuration of a computer that in which the present invention can be implemented.

FIG. 15 is a diagram showing an example of hardware configuration of a computer 500 that functions as the editing apparatus 10. The computer 500 has a CPU peripheral section, including a CPU 1000, a RAM 1020 and a graphic controller 1075 that are interconnected by a host controller 1082; an input/output section, including a communication interface 1030, a hard disk drive 1040 and a CD-ROM drive 1060 that are connected to the host controller 1082 by an input/output controller 1084; and a legacy input/output section, including a BIOS 1010, a flexible disk drive 1050 and an input/output chip 1070 that are connected to the input/output controller 1084.

The host controller 1082 connects the RAM 1020 to the CPU 1000, which accesses the RAM 1020 at a high transfer rate, and the graphic controller 1075. The CPU 1000 is operated based on BIOS 1010 and programs stored in the RAM 1020, and controls each section. The graphic controller 1075 obtains image data that the CPU 1000 generates in a frame buffer in the RAM 1020 and displays the image on a display device 1080. For example, the RAM 1020 may function as the vertex coordinate storage section 110 in FIG. 1. Instead of the abovementioned configuration the graphic controller 1075 may internally include a frame buffer for storing image data generated, for example, by the CPU 1000.

The input/output controller 1084 connects the host controller 1082 to the communication interface 1030, the hard disk drive 1040 and the CD-ROM drive 1060, all of which are relatively fast input/output devices. The communication interface 1030 communicates with an external device via a network. The hard disk drive 1040 stores programs and data used by the computer 500. And the CD-ROM drive 1060 reads programs or data from a CD-ROM 1095 and provides the programs or data to the input/output chip 1070 via the RAM 1020.

Relatively slow input/output devices, such as the BIOS 1010, the flexible disk drive 1050 and the input/output chip 1070, are connected to the input/output controller 1084. The BIOS 1010 includes, for example, a boot program that the CPU 1000 executes when the computer 500 is activated and programs that depend on the hardware of the computer 500. The flexible disk drive 1050 reads a program or data from a flexible disk 1090, and provides the program or the data to the input/output chip 1070 via the RAM 1020. The input/output chip 1070 connects the flexible disk drive 1050 or various types of input/output devices, via a parallel port, a serial port, a keyboard port and a mouse port, for example.

A program provided for the computer 500 by a user is recorded on a flexible disk 1090, CD-ROM 1095 or another recording medium, such as an IC card. Then, the program is read from the recording medium via the input/output chip 1070 and/or the input/output controller 1084, and is installed in and executed by the computer 500. Since the operation of the computer 500 the program causes to carry out is the same as explained for the editing apparatus 10 while referring to FIGS. 1 to 14, no further explanation for it will be given.

The above described program may be stored on an external storage medium. This storage medium may be not only a flexible disk 1090 or a CD-ROM 1095, but also an optical recording medium such as a DVD or a PD, a magneto-optical recording medium such as an MD, a tape medium, or a semiconductor memory such as an IC card. Furthermore, a storage device such as a hard disk or a RAM, provided for a server system connected to a private communication network or the Internet may be employed as a recording medium, and a program may be provided for the computer 500 via the network.

The present invention has been described by employing the preferred embodiment. However, the technical scope of the present invention is not limited to this embodiment, and it will be obvious to one with ordinary skill in the art that the embodiment can be variously modified or improved. As is apparent from the claims of the invention, such modifications or improvements can also be included within the technical scope of the invention.

What is claimed is:

1. An editing method for editing an object on a screen using a computer that is provided with an object input display section and an object extension section, comprising:

inputting at least one content through the object input display section;

displaying said at least one content as objects on the screen;

positioning said displayed objects on the screen such that said displayed objects are non-overlapping;

determining a direction of a character string in each of said objects that is aligned on a line that is parallel with a vertical coordinate axis of the objects that are displayed, wherein vertically directed character strings are aligned with a line that is parallel with a right side vertical coordinate axis and horizontally directed character strings are aligned dependent upon a determination of a language, wherein left-to-right character strings are aligned with a line that is parallel with a left side vertical coordinate axis and right-to-left character strings are aligned with a line parallel with said right side vertical coordinate axis;

extending, through said object extension section, at least one side of an external form of each content-containing object so that said side is superimposed on a side of another content-containing object or an extension of said another content-containing object side, such that no gap exists between external forms of each of said content-containing objects, wherein one of a right side or a left side of each object external form is extended based on said determined direction of said character string included in each object, performing an alignment process on said extended objects so that extended external forms of said extended objects do not overlap one another, said overlap being determined by comparing coordinates of individual vertexes of said objects;

determining and maintaining object candidates for alignment of the left side of an object by cycling through a position array for each of the objects, up to the number of objects, to determine the leftmost position for each of the objects;

utilizing the left side of horizontal character strings as a reference for changing positions in a position array;

utilizing the right side of vertical character strings as a reference for changing positions in a position array;

using blank cells to create rectangular arrangements without gaps;

determining the leftmost location of one of the objects by substituting an infinite value for a variable, and repeatedly substituting the variable with the leftmost location of an object array, until the entire one of the objects is determined to be located to the right of another one of the objects; and displaying said plurality of extended objects to occupy the entire screen, wherein a blank cell arrangement section, which does not contain content to be displayed, is added to locations where said content-containing objects are not displayed as said locations are created by limiting said extension of said content-containing objects up to an extension of a boundary line associated with another one of said content-containing objects.

2. The editing method according to claim 1, wherein a left side extension and alignment process is performed to extend the left side of each object so as to be superimposed on an extension line of the left side of one of the objects, and a right side extension and alignment process is performed to extend the right side of each object so as to overlap an extension line on the right side of one of the objects.

3. The editing method according to claim 2, wherein, in response to the right side extension and alignment process, the left side extension and a concatenation process for extending an external form of each object that is displayed entirely on the right side of at least one of the plurality of objects is performed, such that the left side of the extended object is superimposed on the right side of at least one of the plurality of objects or on the extension line thereof.

4. An editing apparatus for editing an object on a screen using a computer comprising:

an object input display section for inputting at least one content through the object input display section, and displaying said at least one content as objects on the screen;

an object extension section, for positioning said displayed objects on the screen such that said displayed objects are non-overlapping, wherein the object extension section determines a direction of a character string in each of said objects that is aligned on a line that is parallel with a vertical coordinate axis of the objects that are displayed, wherein vertically directed character strings are aligned with a line that is parallel with a right side vertical coordinate axis and horizontally directed character strings are aligned dependent upon a determination of a language, wherein left-to-right character strings are aligned with a line that is parallel with a left side vertical coordinate axis and right-to-left character strings are aligned with a line parallel with said right side vertical coordinate axis, wherein the object extension section extends, at least one side of an external form of each content-containing object so that said side is superimposed on a side of another content-containing object or an extension of said another content-containing object side, such that no gap exists between external forms of each of said content-containing objects, wherein one of a right side or a left side of each object external form is extended based on said determined direction of said character string included in each object, wherein the object extension section performs an alignment process on said extended objects so that extended external forms of said extended objects do not overlap one another, said overlap being determined by comparing coordinates of individual vertexes of said objects;

wherein the object extension section further determines and maintains object candidates for alignment of the left side of an object by cycling through a position array for each of the objects, up to the number of objects, to determine the leftmost position for each of the objects;

wherein the object extension section determines the leftmost location of one of the objects by substituting an infinite value for a variable, and repeatedly substituting the variable with the leftmost location of an object array, until the entire one of the objects is determined to be located to the right of another one of the objects; and an object output display section that displays said plurality of extended objects to occupy the entire screen, wherein a blank cell arrangement section, which does not contain content to be displayed, is added to locations where said content-containing objects are not displayed as said locations are created by limiting said extension of said content-containing objects up to an extension of a boundary line associated with another one of said content-containing objects.

5. The editing apparatus according to claim 4, wherein the object extension section performs a left side extension and alignment process to extend the left side of each object so as to be superimposed on an extension line of the left side of one of the objects, and a right side extension and alignment process is performed to extend the right side of each object so as to overlap an extension line on the right side of one of the objects.

6. The editing apparatus according to claim 4, wherein, the object extension section performs, in response to the right side extension and alignment process, the left side extension and a concatenation process for extending an external form of each object that is displayed entirely on the right side of at least one of the plurality of objects is performed, such that the left side of the extended object is superimposed on the right side of at least one of the plurality of objects or on the extension line thereof.

7. A computer program product stored on a computer storage medium for editing an object on a screen using a computer comprising:

computer program code for creating an object input display section for inputting at least one content through the object input display section, and displaying said at least one content as objects on the screen;

computer program code for creating an object extension section for positioning said displayed objects on the screen such that said displayed objects are non-overlapping, wherein the object extension section determines a direction of a character string in each of said objects that is aligned on a line that is parallel with a vertical coordinate axis of the objects that are displayed, wherein vertically directed character strings are aligned with a line that is parallel with a right side vertical coordinate axis and horizontally directed character strings are aligned dependent upon a determination of a language, wherein left-to-right character strings are aligned with a line that is parallel with a left side vertical coordinate axis and right-to-left character strings are aligned with a line parallel with said right side vertical coordinate axis, wherein the object extension section extends, at least one side of an external form of each content-containing object so that said side is superimposed on a side of another content-containing object or an extension of said another content-containing object side, such that no gap exists between external forms of each of said content-containing objects, wherein one of a right side or a left side of each object external form is extended based on said determined direction of said character string included in each object, wherein the object extension section performs an alignment process on said extended objects so that extended external forms of said extended objects do not overlap one another, said overlap being determined by comparing coordinates of individual vertexes of said objects;

wherein the object extension section further determines and maintains object candidates for alignment of the left side of an object by cycling through a position array for each of the objects, up to the number of objects, to determine the leftmost position for each of the objects;

wherein the object extension section determines the leftmost location of one of the objects by substituting an infinite value for a variable, and repeatedly substituting the variable with the leftmost location of an object array, until the entire one of the objects is determined to be located to the right of another one of the objects; and computer program code for creating an object output display section that displays said plurality of extended objects to occupy the entire screen, wherein a blank cell arrangement section, which does not contain content to be displayed, is added to locations where said content-containing objects are not displayed as said locations are created by limiting said extension of said content-containing objects up to an extension of a boundary line associated with another one of said content-containing objects.

8. The computer program product according to claim 7, wherein the object extension section performs a left side extension and alignment process to extend the left side of each object so as to be superimposed on an extension line of the left side of one of the objects, and a right side extension and alignment process is performed to extend the right side of each object so as to overlap an extension line on the right side of one of the objects.

9. The computer program product according to claim 7, wherein, the object extension section performs, in response to the right side extension and alignment process, the left side extension and a concatenation process for extending an external form of each object that is displayed entirely on the right side of at least one of the plurality of objects is performed, such that the left side of the extended object is superimposed on the right side of at least one of the plurality of objects or on the extension line thereof.

* * * * *